US012460059B2

(12) United States Patent
Miguchi et al.

(10) Patent No.: US 12,460,059 B2
(45) Date of Patent: Nov. 4, 2025

(54) DECORATIVE SHEET (71) Applicant: C.I. TAKIRON CORPORATION, Osaka (JP)

(72) Inventors: Yosuke Miguchi, Osaka (JP); Hitomi Ono, Osaka (JP)

(73) Assignee: C.I. TAKIRON CORPORATION, Osaka (JP)

( * ) Notice: Subject to any disclaimer, the term of this patent is extended or adjusted under 35 U.S.C. 154(b) by 272 days.

(21) Appl. No.: 18/546,189

(22) PCT Filed: Feb. 10, 2022

(86) PCT No.: PCT/JP2022/005336
§ 371 (c)(1),
(2) Date: Aug. 11, 2023

(87) PCT Pub. No.: WO2022/181354
PCT Pub. Date: Sep. 1, 2022

(65) Prior Publication Data
US 2024/0132686 A1 Apr. 25, 2024
US 2024/0228718 A9 Jul. 11, 2024

(30) Foreign Application Priority Data

Feb. 24, 2021 (JP) .................................. 2021-027686

(51) Int. Cl.
*C08J 7/18* (2006.01)
*C08J 5/04* (2006.01)
*C08L 75/14* (2006.01)

(52) U.S. Cl.
CPC .................. *C08J 7/18* (2013.01); *C08J 5/045* (2013.01); *C08L 75/14* (2013.01); *C08J 2367/02* (2013.01);

(Continued)

(58) Field of Classification Search
CPC .............. C08F 290/067; C08F 220/281; C08J 2367/02; C08J 2375/04; C08J 2433/08;
(Continued)

(56) References Cited

U.S. PATENT DOCUMENTS

2013/0129980 A1 5/2013 Meinhard et al.
2016/0145449 A1 5/2016 Hilgers
2021/0094835 A1 4/2021 Egami et al.

FOREIGN PATENT DOCUMENTS

JP 2004-351807 A 12/2004
JP 2010-186124 A 8/2010
(Continued)

OTHER PUBLICATIONS

International Search Report and Written Opinion for PCT/JP2022/005336 (ISA/JP) mailed Apr. 26, 2022 w/English translation (11 pages).

*Primary Examiner* — Lawrence D Ferguson
(74) *Attorney, Agent, or Firm* — Buchalter, a Professional Corporation (57) ABSTRACT

A decorative sheet (1) includes: a base material (2); and a surface layer (3) located on the base material (2). The surface layer (3) is composed of a continuous layer (4) and a dispersion (5), the continuous layer (4) being composed of an ultraviolet-cured layer (6) located on a surface (2a) of the base material (2) and an excimer light-cured layer (7) located on a surface (6a) of the ultraviolet-cured layer (6), and the dispersion (5) being dispersed in the continuous layer (4) and composed of either or both of organic particles and inorganic particles. The standard deviation σ [μm] of the surface roughness Sa of the opposite surface (3a) of the surface layer (3) from the base material (2) divided by the thickness T [μm] of the continuous layer (4) is 7% or less.

8 Claims, 2 Drawing Sheets (52) U.S. Cl.
CPC ........ *C08J 2375/04* (2013.01); *C08J 2433/08* (2013.01); *C08L 2205/16* (2013.01)

(58) Field of Classification Search
CPC ........ C08J 2475/14; C08J 5/045; C08J 7/042; C08J 7/18; C08L 2205/16; C08L 75/14; C09D 175/16; B32B 27/00; B32B 27/16; E04F 13/07; E04F 13/18
See application file for complete search history.

(56) References Cited

FOREIGN PATENT DOCUMENTS

| | | |
|---|---|---|
| JP | 2015-077691 A | 4/2015 |
| JP | 2016-525158 A | 8/2016 |
| JP | 2018-164901 A | 10/2018 |
| JP | 2020-026466 A | 2/2020 |
| JP | 2021-024102 A | 2/2021 |
| JP | 2021-137990 A | 9/2021 |
| JP | 2022-025624 A | 2/2022 |
| JP | 2022 048111 A | 3/2022 |
| WO | WO 2019/131873 A1 | 4/2020 |

DECORATIVE SHEET

CROSS REFERENCE TO RELATED APPLICATIONS

This application is a National Stage Application, filed under 35 U.S.C. § 371, of International Application No. PCT/JP2022/005336, filed Feb. 10, 2022, which international application claims priority to and the benefit of Japanese Application No. 2021-027686, filed Feb. 24, 2021; the contents of both of which as are hereby incorporated by reference in their entireties.

BACKGROUND

Technical Field

The present disclosure relates to decorative sheets.

Description of Related Art

Decorative sheets are used in various applications such as surface decorations of wall materials, moldings, building materials such as doors and windows, and furniture, automobile interiors, and low-voltage mountings to improve design by applying surface decorations. For example, decorative sheets in which a layer having a low gloss (matting) effect is formed on a base material are known in the art.

For example, a decorative sheet has been proposed that includes on a base material a decorative layer containing a colorant and also includes on the decorative layer a clear layer containing wet gel method silica particles having an average particle size of 5 mm or less as measured by the Coulter counter method (AP 50 mm). It is described that, with this configuration, a decorative sheet can be provided that suitably retains the color of a colored layer and therefore has a satisfactory matte surface even when the decorative sheet has a clear layer containing inorganic particles (see, for example, Patent Document Japanese Unexamined Patent Publication No. 2015-77691).

Another decorative sheet has been proposed in which the surface of a coating film structure formed on a base material is irradiated with excimer light emitted from an excimer lamp to reduce the gloss of the portion of the surface of the coating film structure irradiated with electromagnetic waves compared to before the irradiation with the electromagnetic waves. It is described that, with this configuration, a decorative sheet having regions with different matt feelings can be provided (see, for example, Patent Document Japanese Unexamined Patent Publication No. 2018-164901).

BRIEF SUMMARY

However, in the decorative sheet described in Patent Document 1, silica particles are merely added to the clear layer, which does not provide a sufficient matting effect. Therefore, this decorative sheet is disadvantageous in that it is less likely to exhibit low glossiness.

In the decorative sheet described in Patent Document 2, no silica particles are added to the clear layer, and the clear layer is merely irradiated with excimer light, which does not provide a sufficient matting effect. Moreover, irregularities are unevenly formed in the clear layer. Therefore, this decorative sheet is disadvantageous in that it has a less aesthetic appearance (design).

The present invention was made to solve the above problems, and it is an object of the present invention to provide a decorative sheet that has low glossiness due to a matting effect and has an excellent aesthetic appearance.

In order to achieve the above object, a decorative sheet of the present invention is characterized by including: a base material; and a surface layer located on the base material. The surface layer is composed of a continuous layer and a dispersion, the continuous layer being composed of an ultraviolet-cured layer located on a surface of the base material and an excimer light-cured layer located on a surface of the ultraviolet-cured layer, and the dispersion being dispersed in the continuous layer and composed of either or both of organic particles and inorganic particles. A standard deviation of surface roughness Sa of an opposite surface of the surface layer from the base material divided by a thickness of the continuous layer is 7% or less.

According to the present invention, it is possible to provide a decorative sheet having low glossiness and having irregularities uniformly formed in the entire surface of a surface layer and thus having an excellent aesthetic appearance.

DETAILED DESCRIPTION OF VARIOUS EMBODIMENTS

Hereinafter, a decorative sheet of the present invention will be specifically described. The present invention is not limited to the following embodiment, and may be modified and applied as appropriate without departing from the spirit and scope of the present invention.

Decorative Sheet

Figure 1:
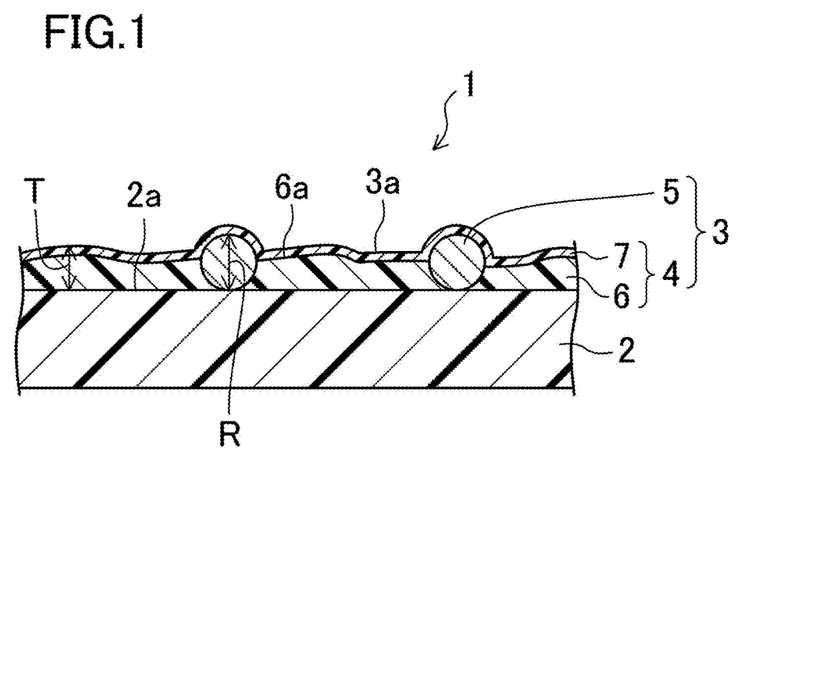
FIG. 1 is a sectional view of a decorative sheet according to an embodiment of the present invention.

As shown in FIG. 1, a decorative sheet 1 of the present invention includes a base material 2 and a surface layer 3 formed on a surface 2*a* of the base material 2.

Base Material

The base material 2 is, for example, a thermoplastic resin sheet. This thermoplastic resin sheet can be a sheet that is commonly used as a base material of the decorative sheet 2. Specific examples include a polyvinyl chloride sheet, a polyethylene terephthalate glycol-modified (PETG) sheet, an amorphous-polyethylene terephthalate (APET) sheet, a polyolefin sheet (a polyethylene sheet, a polypropylene sheet, etc.), an acrylonitrile butadiene styrene (ABS) sheet, and a polycarbonate sheet. The amorphous-polyethylene terephthalate (APET) sheet that is used as the base material 2 can be a recycled polyethylene terephthalate (RPET) sheet made of PET bottles etc.

The thermoplastic resin sheet is preferably a polyethylene terephthalate glycol-modified sheet in terms of its ease of secondary curved surface processing and its excellent three-dimensional formability. A polyethylene terephthalate glycol-modified sheet is a type of polyethylene terephthalate. While polyethylene terephthalate contains ethylene glycol as a glycol component, polyethylene terephthalate glycol-modified is an amorphous polyester containing a diol other than ethylene glycol (1,4-cyclohexanedimethanol) in addition to ethylene glycol as glycol components.

The thermoplastic resin sheet may be either a stretched sheet or an unstretched sheet. The thermoplastic resin sheet may contain additives such as a colorant, an ultraviolet absorber, a light stabilizer, an antioxidant, an antistatic agent, a storage stabilizer, a lubricant, and a filler, as needed. The thermoplastic resin sheet is preferably colored in terms of design.

The thickness of the base material 2 is, but not particularly limited to, preferably 50 µm to 800 µm, more preferably 250 µm to 500 µm. The base material 2 with a thickness of 50 µm or more sufficiently improves mechanical strength and hiding properties. The base material 2 with a thickness of 800 µm or less has improved three-dimensional formability and easily provides sufficient flexibility and printability.

Surface Layer

The surface layer 3 is composed of: a continuous layer 4 that is a coating film of a paint composed mainly of a urethane acrylate and a monofunctional acrylate; and a dispersion 5 composed of either or both of organic particles and inorganic particles.

The surface layer 3 can be formed by coating the surface 2a of the base material 2 with a paint containing the dispersion 5 and curing the paint. The surface layer 3 is formed by the continuous layer 4 that is a cured paint and the dispersion 5 that is particles dispersed in the continuous layer 4.

As shown in FIG. 1, the continuous layer 4 is composed of an ultraviolet-cured layer 6 formed on the surface 2a of the base material 2 and an excimer light-cured layer 7 formed on a surface 6a of the ultraviolet-cured layer 6. The excimer light-cured layer 7 is formed so as to cover the dispersion 5 over the surface 6a of the ultraviolet-cured layer 6.

As shown in FIG. 1, a surface 3a of the surface layer 3 (i.e., the opposite surface from the base material 2) has wrinkles and also has irregularities originating from the dispersion 5.

The urethane acrylate of the continuous layer 4 is a di- to deca-functional urethane acrylate, such as a phenyl glycidyl ether acrylate hexamethylene diisocyanate urethane prepolymer, a pentaerythritol triacrylate hexamethylene diisocyanate urethane prepolymer, and a dipentaerythritol pentaacrylate hexamethylene diisocyanate urethane prepolymer. The urethane acrylate of the continuous layer 4 may be a commercially available product such as EBECRYL 8402, KRM 8452, EBECRYL 210, EBECRYL 220, EBECRYL 4500, EBECRYL 230, EBECRYL 270, EBECRYL 4858, EBECRYL 8804, EBECRYL 8807, EBECRYL 9270, EBECRYL 4100, EBECRYL 4513, EBECRYL 8311, EBECRYL 8465, EBECRYL 9260, EBECRYL 8701, KRM 8667, EBECRYL 4265, EBECRYL 4587, EBECRYL 4200, EBECRYL 8210, EBECRYL 1290, EBECRYL 5129, EBECRYL 8254, EBECRYL 8301R, KRM 8200, KRM 8904, RUA-062-NS (product containing a difunctional acrylate monomer), U-6LPA, UA-1100H, U-200PA, UA-160TM, and UV-7600B (all of which are product names). These urethane acrylates may be used either alone or in combination of two or more.

Examples of the monofunctional acrylate of the continuous layer 4 include ethyl carbitol acrylate, methoxyethylene glycol (meth)acrylate, methoxypolyethylene glycol (meth)acrylate, β-(meth)acryloyloxyethyl hydrogen phthalate, β-(meth)acryloyloxyethyl hydrogen succinate, nonylphenoxyethyl (meth)acrylate, 3-chloro-2-hydroxypropyl (meth)acrylate, phenoxyethyl (meth)acrylate, phenoxy polyethylene glycol (meth)acrylate, butoxy polyethylene glycol (meth)acrylate, alkyl (meth)acrylate, cyclohexyl (meth)acrylate, tetrahydrofurfuryl (meth)acrylate, isobornyl (meth)acrylate, benzyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl-2-hydroxyethylphthalic acid, 3-acryloyloxyglycerine mono (meth)acrylate, 2-hydroxybutyl (meth)acrylate, 2-hydroxy-1-(meth)acryloxy-3-(meth)acryloxypropane, polypropylene glycol mono(meth)acrylate, polyethylene glycol mono(meth)acrylate, polyε-caprolactone mono(meth)acrylate, dialkylaminoethyl (meth)acrylate, glycidyl (meth)acrylate, mono[2-(meth)acryloyloxyethyl]acid phosphate, trifluoroethyl (meth)acrylate, 2,2,3,3-tetrafluoropropyl (meth)acrylate, 2,2,3,4,4,4-hexafluorobutyl (meth)acrylate, perfluorooctylethyl (meth)acrylate, dicyclopentenyloxyalkyl (meth)acrylate, dicyclopentenyl (meth)acrylate, tricyclodecanyl (meth)acrylate, tricyclodecanyloxyethyl (meth)acrylate, and isobornyloxyethyl (meth)acrylate. These monofunctional acrylates may be used either alone or in combination of two or more.

Although the blending ratio of the urethane acrylate to the monofunctional acrylate in the continuous layer 4 is not particularly limited unless the characteristics of the decorative sheet 1 of the present invention are affected, the mass ratio of the urethane acrylate to the monofunctional acrylate is preferably in the range of 10:90 to 90:10. This is for the following reason. The urethane acrylate has low fluidity. Therefore, as the mass ratio of the urethane acrylate increases, wrinkles are less likely to be formed in the surface 3a of the surface layer 3, and the decorative sheet is less likely to exhibit low glossiness from the matting effect. The monofunctional acrylate has low reactivity. Therefore, as the mass ratio of the monofunctional acrylate increases, the paint is less likely to cure.

The thickness of the continuous layer 4 (i.e., the thickness of the portion of the continuous layer 4 where the dispersion 5 is not located; the thickness T shown in FIG. 1) is, but not particularly limited to, preferably 1 µm to 45 µm, more preferably 1 µm to 10 µm. When the thickness of the continuous layer 4 is less than 1 µm, the coating film region that is movable during excimer irradiation is reduced. Therefore, wrinkles are less likely to be formed, and the decorative sheet may be less likely to exhibit low glossiness from the matting effect. When the thickness of the continuous layer 4 is greater than 45 µm, tactility further decreases and hardness increases, which may reduce formability. When the thickness of the continuous layer 4 is greater than 10 µm, the surface roughness Sa of the surface layer 3 increases, which increases fingerprint resistance but may reduce tactility.

The dispersion 5 is intended to form irregularities uniformly in the entire surface 3a of the surface layer 3 to improve the aesthetic appearance (design) of the decorative sheet 1. That is, since irregularities originating from the uniformly dispersed dispersion 5 are formed in the surface layer 3, the irregularities can be uniformly formed in the entire surface 3a of the surface layer 3.

Examples of the material of the organic particles of the dispersion 5 include an acrylic copolymer, cellulose nanofiber particles, polystyrene, epoxy, polyester, polyamide, polyurethane, and melamine. Examples of the material of the inorganic particles of the dispersion 5 include glass, silica, alumina, zirconia, yttria, magnesia, and silicon nitride. From the standpoint of providing low glossiness of the surface layer 3, it is preferable to use inorganic particles such as glass or silica. These materials may be used either alone or in combination of two or more.

In the case where substantially spherical particles are used as the dispersion 5, the average particle size R shown in FIG. 1 is preferably 0.1 µm or more and 10 µm or less. When the average particle size R is less than 0.1 µm, secondary agglomeration of the particles occurs, which may cause an unevenly dispersed state in the continuous layer, resulting in irregularities being unevenly formed. When the average particle size R is greater than 10 µm, detachment of the particles may occur.

The "average particle size" as used herein refers to the 50 percentile particle size (D50), and can be measured as a volume average particle size by a laser diffraction/scattering particle size distribution analyzer (Microtrack (registered trademark) particle size distribution analyzer MT3200 made by NIKKISO CO., LTD) etc.

In the case where cellulose nanofiber particles are used as the dispersion 5, the aspect ratio of the particles is high. Therefore, even when the average particle size (BET average particle size) is less than 0.1 µm, second agglomeration of the particles will not occur due to physical obstruction, and an unevenly dispersed state will not be caused in the continuous layer. Accordingly, irregularities can be uniformly formed in the entire surface of the surface layer.

The BET average particle size of the cellulose nanofiber particles can be measured using a BET method. More specifically, the average particle size of the cellulose nanofiber particles refers to the particle size calculated by the formula of "average particle size (nm)=6000/(S×density)" using the specific surface area S (m$^2$/g) measured by the BET method and the density (g/cm$^3$) of the cellulose nanofiber particles.

Moreover, fine cracks originating from cellulose nanofibers will develop but large cracks that affect the appearance will not develop during heat stretching. Therefore, by using the cellulose nanofiber particles as the dispersion 5, a decorative sheet having high heat stretchability can be obtained (that is, when the decorative sheet is heat-stretched, linear cracks will not at all develop along the length in a direction perpendicular to the heat stretching direction, and therefore the decorative sheet has an excellent appearance).

The average particle size R of the dispersion 5 is preferably 0.001 times or more and four times or less the thickness T of the continuous layer 4, more preferably 0.01 times or more and four times or less the thickness T of the continuous layer 4. When the average particle size R of the dispersion 5 is less than 0.001 times the thickness T of the continuous layer 4, it may be difficult to uniformly form irregularities by the dispersion 5. When the average particle size R of the dispersion 5 is larger than four times the thickness T of the continuous layer 4, the ratio of the volume of the dispersion 5 to the total volume of the continuous layer 4 is too high. This limits formation of irregularities by the dispersion 5 when coating the surface 2a of the base material 2 with a paint containing the dispersion 5. As a result, it may be difficult to uniformly form irregularities by the dispersion 5.

The surface layer 3 preferably contains 10 parts by mass or more and 90 parts by mass or less of the dispersion 5 per 100 parts by mass of the continuous layer 4. When the surface layer 3 contains less than 10 parts by mass of the dispersion 5, the surface roughness Sa of the surface layer 3 may vary due to irregularities being insufficiently formed in the entire surface 3a of the surface layer 3. When the surface layer 3 contains more than 90 parts by mass of the dispersion 5, cost is increased because the dispersion 5 is expensive and a larger amount of dispersion 5 is used.

The paint for forming the surface layer 3 may also contain components other than the urethane acrylate, the monofunctional acrylate, and the dispersion 5 within the range that does not affect the advantageous effects of the invention. Examples of such other components a photoinitiator, a colorant, an ultraviolet absorber, a light stabilizer, an antioxidant, an antistatic agent, a storage stabilizer, a plasticizer, a lubricant, and a filler.

Examples of the photoinitiator include an alkylphenone initiator, an acylphosphine oxide initiator, and a cationic initiator.

Manufacturing Method

When manufacturing the decorative sheet 1 of the present invention, a base material 2 that is, for example, the thermoplastic resin sheet described above is first prepared. The thermoplastic resin sheet may be either a commercially available thermoplastic resin sheet or a thermoplastic resin sheet manufactured by a known manufacturing method such as calendering or extrusion molding.

Next, the surface 2a of the base material 2 is coated with a coating material containing a urethane acrylate, a monofunctional acrylate, a photoinitiator, and the dispersion 5 to form a coating film, which will later become the surface layer 3, on the surface 2a of the base material 2.

For example, when a urethane acrylate containing a difunctional acrylate monomer such as RUA-062-NS mentioned above is used, the monofunctional acrylate may be omitted.

Examples of the coating method for the paint includes, but are not particularly limited to, cast coating, die coating, gravure coating, roll-knife coating, reverse roll coating, roll coating, and comma coating.

The coating film formed on the surface 2a of the base material 2 is then irradiated with excimer light. More specifically, the coating film is irradiated with excimer light having a short peak wavelength (in the range of 120 nm to 230 nm). Only the outermost surface of the coating film that will later become as the surface layer 3 is thus cured to form the excimer light-cured layer 7 described above. This causes non-uniformity between the surface and the inside of the coating film, so that the coating film component moves from the unreacted portion inside the coating film to the surface of the coating film. Wrinkles are thus formed in the surface of the coating film. As a result, the gloss (low glossiness) in the surface layer 3 can be achieved.

When irradiating with excimer light using an excimer lamp, the peak wavelength of electromagnetic waves can be changed by changing a discharge gas used in the excimer lamp. Examples of the discharge gas for irradiating with excimer light having the above peak wavelength include $Ar^2$, $Kr^2$, and $Xe^2$.

The coating film is then irradiated with ultraviolet rays (350 mm to 450 nm) to form the ultraviolet-cured layer 6. The surface layer 3 is thus formed which is composed of: the continuous layer 4 composed of the ultraviolet-cured layer 6 formed on the surface 2a of the base material 2 and the excimer light-cured layer 7 formed on the surface 6a of the ultraviolet-cured layer 6; and the dispersion 5 dispersed in the continuous layer 4. Irregularities are uniformly formed in the entire surface 2a by the dispersion 5. The decorative sheet 1 with an improved aesthetic appearance due to the uniformly formed irregularities and with low glossiness maintained by the excimer irradiation is thus manufactured.

The coating film is not completely cured even when the coating film is irradiated again with excimer light having a short peak wavelength (in the range of 120 mm to 230 nm) instead of the ultraviolet rays (350 mm to 450 nm).

In the decorative sheet 1 of the present invention, as described above, irregularities are uniformly formed in the entire surface 3a of the surface layer 3 by the dispersion 5. Therefore, the standard deviation σ[μm] of the surface roughness Sa [μm] of the surface 3a of the surface layer 3 is 0.2 or less.

The "surface roughness Sa" as used herein refers to a "three-dimensional surface texture parameter (three-dimensional arithmetic average roughness)" as defined in ISO 25178.

The "standard deviation σ of the surface roughness Sa" indicates the spread width of the surface roughness Sa (variation in surface roughness Sa). This standard deviation σ can be obtained by the method described below.

The decorative sheet 1 of the present invention is characterized in that the standard deviation σ [μm] of the surface roughness Sa divided by the thickness T [μm] of the continuous layer 4 is 7% or less (i.e., the following formula (1) is satisfied).

[Math 1]

$$(\text{standard deviation } \sigma \text{ [μm] of surface roughness } Sa/\text{thickness } T \text{ of continuous layer } 4) \times 100 \leq 7 \text{ [\%]} \quad (1)$$

It is therefore possible to provide the decorative sheet 1 having an excellent aesthetic appearance with irregularities uniformly formed in the entire surface 3a of the surface layer 3, as described above.

The decorative sheet 1 of the present invention also has low glossiness because the gloss G of the surface 3a of the surface layer 3 is 13 or less due to the above matting effect of the wrinkles.

The "gloss" as used herein is an index of low gloss properties, and refers to a 60° gloss as measured by the method according to JIS Z 8741:1997.

The gloss G is preferably 10 or less, more preferably 8 or less, from the standpoint of further improving low gross properties and improving design.

As described above, in the decorative sheet 1 of the present invention, the standard deviation σ [μm] of the surface roughness Sa of the surface 3a of the surface layer 3 divided by the thickness T [μm] of the continuous layer 4 is 7% or less. Therefore, it is possible to provide the decorative sheet 1 having an excellent aesthetic appearance with irregularities uniformly formed in the entire surface 3a of the surface layer 3.

It is also possible to provide the decorative sheet 1 having low glossiness due to the above matting effect of the wrinkles.

EXAMPLES

The present invention will be described based on examples. It should be noted that the invention is not limited to these examples, these examples may be modified or changed without departing from the spirit and scope of the present invention, and such modifications and changes are not excluded from the scope of the present invention.

The materials used to produce decorative sheets are as follows.

(1) Urethane acrylate 1: trifunctional urethane acrylate (made by Asia Industry Co., Ltd., product name: RUA-062-NS, containing a bifunctional acrylate monomer)

(2) Urethane acrylate 2: hexafunctional urethane acrylate (made by Mitsubishi Chemical Corporation, product name: UV-7600B)

(3) Urethane acrylate 3: tri- to tetra-functional urethane acrylate (made by DAICEL-ALLNEX LTD., product name: EBECRYL 4265)

(4) Urethane acrylate 4: trifunctional urethane acrylate (made by DAICEL-ALLNEX LTD., product name: EBECRYL 9260)

(5) Monofunctional acrylate: tetrahydrofurfuryl acrylate (made by Tokyo Chemical Industry Co., Ltd., product name: Tetrahydrofurfuryl Acrylate)

(6) Initiator: alkylphenone photoinitiator (made by IGM Resins B.V., product name: Omnirad 1173)

(7) Dispersion 1: low-alkali glass (made by Potters-Ballotini Co., Ltd., product name: EMB-10, average particle size: 5 μm)

(8) Dispersion 2: low-alkali glass (made by Potters-Ballotini Co., Ltd., product name: EMB-20, average particle size: 10 μm)

(9) Dispersion 3: acrylic copolymer microparticles (made by Dainichiseika Color & Chemicals Mfg. Co., Ltd., product name: 030 (10 MD) clear, average particle size: 9 μm)

(10) Dispersion 4: silica microparticles (made by Denka Company Limited., product name: UFP-30, average particle size: 0.1 μm)

(11) Dispersion 5: cellulose nanofiber particles (made by MORI MACHINERY CORPORATION, product name: C-100 (IPA), IPA-dispersed cellulose nanofibers, solid content: 5%, average particle size: 0.027 μm)

(12) Dispersion 6: cellulose nanofiber particles (made by Sugino Machine Limited, product name: Ima-10002, water-dispersed cellulose nanofibers replaced with acetone, solid content: 2%, average particle size: 0.01 μm to 0.05 μm)

(13) Dispersion 7: cellulose nanofiber particles (made by Sugino Machine Limited, product name: Wfo-10002, water-dispersed cellulose nanofibers replaced with acetone, solid content: 2%, average particle size: 0.01 μm to 0.05 μm)

(14) Urethane Acrylate 5: hexafunctional urethane acrylate and hexafunctional acrylate (made by SHOWA INK MANUFACTURING CO., LTD., product name: HGUV-022)

Example 1

Production of Decorative Sheet

First, RPET with a thickness of 250 μm was prepared as a base material. Next, the materials shown in Table 1 were blended to prepare a paint of Example 1 having the composition (parts by mass) shown in Table 1. The surface of the base material was coated with this paint using a bar coater to form a coating film, which would later become a surface layer, on the surface of the base material.

The paint that would later become the surface layer contained 16 parts by volume of a dispersion per 100 parts by volume of a material forming a continuous layer (urethane acrylate, monofunctional acrylate).

Next, the coating film was irradiated with excimer light (peak wavelength: 172 nm) using $Xe^2$ as a discharge gas in a nitrogen atmosphere by using an excimer irradiation device (made by M.D. COM, Inc., product name: 172 nm air-cooled excimer irradiation device (model: MEIRA-M-1-152-H4). The coating film was irradiated with a cumulative amount of light of 20 mJ/cm² at an irradiation intensity of 40 mW/cm².

By using an ultraviolet irradiation device (made by EYE GRAPHICS CO., LTD., high pressure ultraviolet curing mercury lamp 4 kW (H04-L41)), the coating film was irradiated with ultraviolet rays (main wavelength: 365 nm) to photocure the coating film. The surface layer composed of the continuous layer containing the dispersion was thus formed on the surface of the base material. A decorative sheet was thus produced. The ultraviolet irradiation was performed under the following conditions: ultraviolet irradiation distance: 15 cm and lamp moving speed: 0.75 m/min, and the irradiation amount was 150 mJ/cm².

Thickness Measurement

Next, the thickness T of the continuous layer in the surface layer of the produced decorative sheet (the thickness of the portion of the continuous layer where the dispersion was not located) was measured using a digital microscope (made by KEYENCE CORPORATION, product name: VHX-5000) or a field emission scanning electron microscope (SEM) (made by Hitachi High-Tech Corporation, product name: S-4800).

More specifically, the sheet was cut to expose a section. The section was observed with the digital microscope (measurement magnification: 500×) or the field emission scanning electron microscope (measurement magnification: 1000×), and ten portions with a large coating film height and ten portions with a small coating film height were selected. The thicknesses of the selected portions were measured, and the average value of the thicknesses was calculated. This measurement was performed three times, and the average value of the coating film heights from the three measurements was calculated as the thickness T of the continuous layer. The results are shown in Table 1.

Gloss Measurement

Subsequently, the 60° gloss G of the surface layer of the produced decorative sheet was measured according to JIS Z 8741:1997 using a gloss meter (made by HORIBA, Ltd., product name: gloss checker IG-320). This measurement was performed five times, and the average value of the glosses from the five measurements was calculated as the gloss G of the surface layer.

The standard deviation $\sigma_G$ was also calculated using the glosses from the five measurements. More specifically, the standard deviation $\sigma_G$ was obtained by the following formula (1), where $G_1$, $G_2$, $G_3$, $G_4$, and $G_5$ represent the glosses from the five measurements. The results are shown in Table 1.

[Math 1]

$$\sigma_G = \sqrt{\frac{\sum_{i=1}^{5}(G_i - G)^2}{4}} \qquad (1)$$

Surface Roughness Measurement

Subsequently, the surface roughness Sa of the surface layer of the produced decorative sheet (surface roughness of the opposite surface of the surface layer from the base material) was measured according to ISO 25178 using a shape analysis laser microscope (made by KEYENCE CORPORATION, product name: VK-X1000). The laser species used was a 404 nm semiconductor laser, and the measurement was performed over a 277 μm×208 μm area using a 50× standard objective lens. This measurement was performed ten times, and the average value of the surface roughnesses Sa from the ten measurements was calculated as the surface roughness Sa of the surface layer.

The standard deviation σ was also calculated using the surface roughnesses Sa from the ten measurements. More specifically, the standard deviation σ was obtained by the following formula (2), where $Sa_1$, $Sa_2$, $Sa_3$, $Sa_4$, $Sa_5$, $Sa_6$, $Sa_7$, $Sa_8$, $Sa_9$, and $Sa_{10}$ represent the surface roughnesses from the ten measurements. The results are shown in Table 1.

[Math 2]

$$\sigma = \sqrt{\frac{\sum_{i=1}^{10}(Sa_i - Sa)^2}{9}} \qquad (2)$$

The surface deviation σ of the surface roughness Sa divided by the thickness T of the continuous layer 3 (i.e., σ/T) was calculated using the calculated standard deviation σ of the surface roughness Sa of the surface layer and the calculated thickness T of the continuous layer 3. The results are shown in Table 1.

Figure 2:
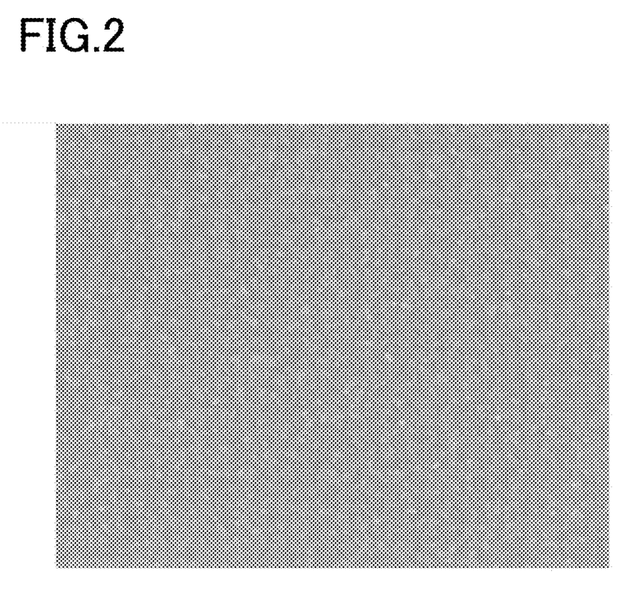
FIG. 2 is a laser micrograph showing the state of the surface of a surface layer in a decorative sheet of Example 1.

FIG. 2 shows a laser micrograph showing the state of the surface of the surface layer in the decorative sheet of this example. It can be seen from FIG. 2 that the decorative sheet of this example has low glossiness and has an excellent appearance with irregularities uniformly formed in the entire surface of the surface layer.

Examples 2 to 28, Comparative Examples 1 to 8

Decorative sheets were produced in the same manner as in Example 1 described above except that the composition of the coating components was changed to the compositions (parts by mass) shown in Tables 1 to 4. No excimer irradiation was performed for Comparative Examples 7 and 8.

The thickness measurement, the gloss measurement, and the surface roughness measurement were performed in the same manner as in Example 1 described above. The results are shown in Tables 1 to 4.

Figure 3:
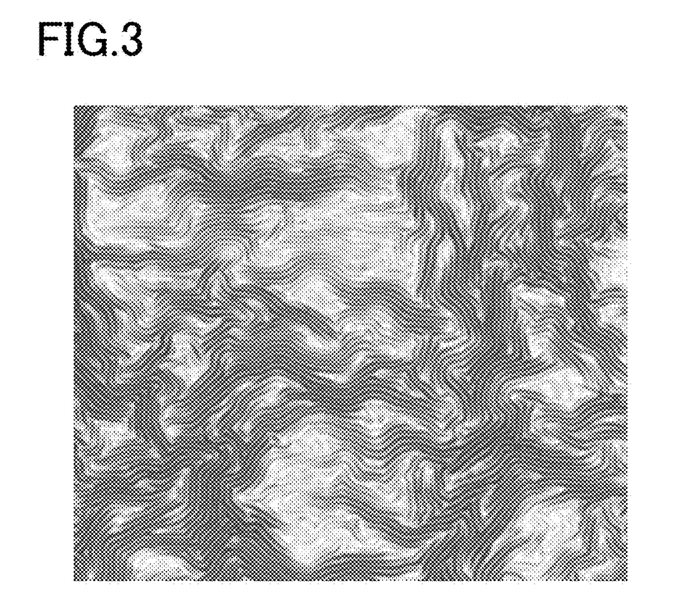
FIG. 3 is a laser micrograph showing the state of the surface of a surface layer in a decorative sheet of Comparative Example 3.

FIG. 3 shows a laser micrograph showing the state of the surface of the surface layer in the decorative sheet of Comparative Example 3. It can be seen from FIG. 3 that the decorative sheet of Comparative Example 3 does not have a sufficient matting effect and has a less aesthetic appearance (design) with irregularities unevenly formed.

Evaluation of Heat Stretchability

The heat stretchability was evaluated for Examples 23 to 28. More specifically, a 50 mm×120 mm test strip was prepared, and a tensile test was conducted in which each test strip was stretched 100% in its longitudinal direction under the following conditions: stretching temperature: 90° C., tensile speed: 300 mm/min, distance between chucks: 80 mm. Each test strip was visually evaluated, with the symbol "○" indicating that no cracks at right angles to the heat stretching direction were observed and the symbol "x" indicating that such cracks were observed. The results are shown in Table 4.

TABLE 1

|  |  | Number of Functional Groups | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Blending Ratio (Parts by Mass) | Urethane Acrylate 1 | 3 | 100 | 100 | 100 | 100 |  |  |  |  |  |  |  |
|  | Urethane Acrylate 2 | 6 |  |  |  |  | 90 | 90 | 70 | 70 |  |  |  |
|  | Urethane Acrylate 3 | 3-4 |  |  |  |  |  |  |  |  | 70 |  |  |
|  | Urethane Acrylate 4 | 3 |  |  |  |  |  |  |  |  |  | 70 | 70 |
|  | Monofunctional Acrylate | 1 |  |  |  |  | 10 | 10 | 30 | 30 | 30 | 30 | 30 |
|  | Initiator |  | 5 | 5 | 5 | 5 | 5 | 5 | 5 | 5 | 5 | 5 | 5 |
|  | Dispersion 1 |  | 50 | 30 | 20 | 10 | 50 | 30 | 50 | 10 | 50 | 50 |  |
|  | Dispersion 2 |  |  |  |  |  |  |  |  |  |  |  | 50 |
|  | Dispersion 3 |  |  |  |  |  |  |  |  |  |  |  |  |
|  | Dispersion 4 |  |  |  |  |  |  |  |  |  |  |  |  |
| Blending Ratio (Parts by Volume) | Dispersion 1 |  | 16 | 10 | 7 | 4 | 16 | 10 | 16 | 4 | 16 | 16 |  |
|  | Dispersion 2 |  |  |  |  |  |  |  |  |  |  |  | 16 |
|  | Dispersion 3 |  |  |  |  |  |  |  |  |  |  |  |  |
|  | Dispersion 4 |  |  |  |  |  |  |  |  |  |  |  |  |
|  | Thickness T of Continuous Layer [μm] |  | 3.2 | 3.2 | 3.2 | 3.2 | 3.2 | 3.2 | 3.2 | 3.2 | 3.2 | 3.2 | 3.2 |
|  | Average Particle Size R of Particles [μM] |  | 5 | 5 | 5 | 5 | 5 | 5 | 5 | 5 | 5 | 5 | 10 |
|  | R/T [—] |  | 1.563 | 1.563 | 1.563 | 1.563 | 1.563 | 1.563 | 1.563 | 1.563 | 1.563 | 1.563 | 3.125 |
| Evaluation | Gloss G [—] | Average Value (n = 5) | 3.1 | 3.3 | 3.8 | 4.9 | 6.8 | 6.7 | 3.0 | 4.7 | 1.3 | 1.1 | 1.0 |
|  |  | Standard Deviation (n = 5) | 0.05 | 0.09 | 0.09 | 0 | 0.30 | 0.27 | 0.12 | 0.07 | 0 | 0 | 0 |
|  | Surface Roughness Sa [μm] | Average Value (n = 10) | 0.9 | 1.0 | 1.2 | 1.0 | 0.6 | 0.6 | 0.8 | 0.8 | 1.5 | 1.9 | 2.5 |
|  |  | Standard Deviation σ [μm] (n = 10) | 0.04 | 0.04 | 0.05 | 0.05 | 0.02 | 0.02 | 0.02 | 0.05 | 0.04 | 0.04 | 0.09 |
|  |  | σ/T [%] | 1.3 | 1.3 | 1.5 | 1.7 | 0.5 | 0.7 | 0.5 | 1.5 | 1.3 | 1.1 | 2.9 |

TABLE 2

|  |  | Number of Functional Groups | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
| Blending Ratio (Parts by Mass) | Urethane Acrylate 1 | 3 |  |  |  |  |  |  |  |  |  |  |  |
|  | Urethane Acrylate 2 | 6 | 90 | 90 | 70 | 70 | 70 | 70 | 70 | 70 | 50 | 50 | 30 |
|  | Urethane Acrylate 3 | 3-4 |  |  |  |  |  |  |  |  |  |  |  |
|  | Urethane Acrylate 4 | 3 |  |  |  |  |  |  |  |  |  |  |  |
|  | Monofunctional Acrylate | 1 | 10 | 10 | 30 | 30 | 30 | 30 | 30 | 30 | 50 | 50 | 70 |
|  | Initiator |  | 5 | 5 | 5 | 5 | 5 | 5 | 5 | 5 | 5 | 5 | 5 |
|  | Dispersion 1 |  | 50 | 30 | 90 | 70 | 50 |  |  |  | 50 | 10 | 50 |
|  | Dispersion 2 |  |  |  |  |  |  | 50 |  |  |  |  |  |
|  | Dispersion 3 |  |  |  |  |  |  |  | 50 |  |  |  |  |
|  | Dispersion 4 |  |  |  |  |  |  |  |  | 50 |  |  |  |
| Blending Ratio (Parts by Volume) | Dispersion 1 |  | 16 | 10 | 26 | 21 | 16 |  |  |  | 16 | 4 | 16 |
|  | Dispersion 2 |  |  |  |  |  |  | 16 |  |  |  |  |  |
|  | Dispersion 3 |  |  |  |  |  |  |  | 29 |  |  |  |  |
|  | Dispersion 4 |  |  |  |  |  |  |  |  | 19 |  |  |  |
|  | Thickness T of Continuous Layer [μm] |  | 6.7 | 6.7 | 6.7 | 6.7 | 6.7 | 6.7 | 6.7 | 6.7 | 6.7 | 6.7 | 6.7 |

TABLE 2-continued

|  |  | Number of Functional Groups | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
|  | Average Particle Size R of Particles [μM] |  | 5 | 5 | 5 | 5 | 5 | 10 | 9 | 0.1 | 5 | 5 | 5 |
|  | R/T [—] |  | 0.746 | 0.746 | 0.746 | 0.746 | 0.746 | 1.493 | 1.343 | 0.015 | 0.746 | 0.746 | 0.746 |
| Evaluation | Gloss G [—] | Average Value (n = 5) | 12.8 | 12.2 | 4.2 | 4.5 | 4.4 | 4.4 | 7.1 | 2.7 | 2.4 | 3.2 | 1.4 |
|  |  | Standard Deviation (n = 5) | 0.64 | 0.47 | 0.07 | 0.04 | 0.17 | 0.07 | 0.21 | 0.19 | 0.15 | 0.05 | 0.08 |
|  | Surface Roughness Sa [μm] | Average Value (n = 10) | 0.4 | 0.5 | 0.8 | 0.8 | 0.8 | 1.0 | 0.6 | 1.0 | 1.3 | 1.7 | 1.6 |
|  |  | Standard Deviation σ [μm] (n = 10) | 0.02 | 0.04 | 0.05 | 0.04 | 0.03 | 0.04 | 0.04 | 0.06 | 0.03 | 0.18 | 0.06 |
|  |  | σ/T [%] | 0.3 | 0.6 | 0.7 | 0.6 | 0.4 | 0.5 | 0.6 | 0.9 | 0.5 | 2.7 | 0.9 |

TABLE 3

|  |  | Number of Functional Groups | Comparative Example 1 | Comparative Example 2 | Comparative Example 3 | Comparative Example 4 | Comparative Example 5 | Comparative Example 6 | Comparative Example 7 (No Excimer Irradiation) | Comparative Example 8 (No Excimer Irradiation) |
|---|---|---|---|---|---|---|---|---|---|---|
| Blending Ratio (Parts by Mass) | Urethane Acrylate 1 | 3 | 100 | 100 |  |  |  |  | 100 |  |
|  | Urethane Acrylate 2 | 6 |  |  | 90 | 70 |  | 50 |  | 70 |
|  | Urethane Acrylate 3 | 3-4 |  |  |  |  | 70 |  |  |  |
|  | Urethane Acrylate 4 | 3 |  |  |  |  |  |  |  |  |
|  | Monofunctional Acrylate | 1 |  |  | 10 | 30 | 30 | 50 |  | 30 |
|  | Initiator |  | 5 | 5 | 5 | 5 | 5 | 5 | 5 | 5 |
|  | Dispersion 1 |  | 5 |  |  |  |  |  | 50 | 50 |
|  | Dispersion 2 |  |  |  |  |  |  |  |  |  |
|  | Dispersion 3 |  |  |  |  |  |  |  |  |  |
|  | Dispersion 4 |  |  |  |  |  |  |  |  |  |
| Blending Ratio (Parts by Volume) | Dispersion 1 |  | 2 |  |  |  |  |  | 16 | 16 |
|  | Dispersion 2 |  |  |  |  |  |  |  |  |  |
|  | Dispersion 3 |  |  |  |  |  |  |  |  |  |
|  | Dispersion 4 |  |  |  |  |  |  |  |  |  |
|  | Thickness T of Continuous Layer [μM] |  | 3.2 | 3.2 | 3.2 | 3.2 | 3.2 | 6.7 | 3.2 | 3.2 |
|  | Average Particle Size R of Particles [μm] |  | 5 | — | — | — | — | — | 5 | 5 |
|  | R/T [—] |  | 1.563 | — | — | — | — | — | 1.563 | 1.563 |
| Evaluation | Gloss G [—] | Average Value (n = 5) | 5.6 | 8.4 | 19.9 | 10.0 | 2.4 | 4.4 | 18.3 | 14.6 |
|  |  | Standard Deviation (n = 5) | 0.16 | 0.78 | 0.55 | 0.70 | 0.16 | 0.38 | 1.20 | 2.30 |
|  | Surface Roughness Sa [μm] | Average Value (n = 10) | 1.1 | 0.6 | 0.5 | 0.7 | 0.4 | 1.5 | 0.4 | 0.4 |
|  |  | Standard Deviation σ [μm] (n = 10) | 0.28 | 0.37 | 0.23 | 0.25 | 0.36 | 1.49 | 0.02 | 0.03 |
|  |  | σ/T [%] | 8.7 | 11.7 | 7.3 | 7.7 | 11.1 | 22.2 | 0.6 | 0.9 |

TABLE 4

| | | Number of Functional Groups | Example 23 | Example 24 | Example 25 | Example 26 | Example 27 | Example 28 |
|---|---|---|---|---|---|---|---|---|
| Blending Ratio (Parts by Mass) | Urethane Acrylate 5 | 6 | 10 | 10 | 10 | 10 | 10 | 10 |
| | Monofunctional Acrylate | 1 | 5.4 | 5.4 | 5.4 | 5.4 | 5.4 | 5.4 |
| | Initiator | | 5 | 5 | 5 | 5 | 5 | 5 |
| | Dispersion 1 | | 5.8 | | 5.8 | | 5.8 | |
| | Dispersion 5 | | 2.3 | 2.3 | | | | |
| | Dispersion 6 | | | | 2.3 | 2.3 | | |
| | Dispersion 7 | | | | | | 2.3 | 2.3 |
| Blending Ratio (Parts by Volume) | Dispersion 1 | | 19 | | 19 | | 19 | |
| | Dispersion 5 | | 1.5 | 1.5 | | | | |
| | Dispersion 6 | | | | 1.5 | 1.5 | | |
| | Dispersion 7 | | | | | | 1.5 | 1.5 |
| | Thickness T of Continuous Layer [μm] | | 8.8 | 7 | 8.8 | 7 | 8.8 | 7 |
| | Average Particle Size R of Particles [μm] | | 3.6 | 0.027 | 3.6 | 0.01–0.05 | 3.6 | 0.01–0.05 |
| | R/T [—] | | 0.409 | 0.004 | 0.409 | 0.001–0.007 | 0.409 | 0.001–0.007 |
| Evaluation | Gloss G [—] | Average Value (n = 5) | 2.3 | 2.8 | 2.2 | 2.4 | 2.3 | 2.1 |
| | | Standard Deviation (n = 5) | 0.09 | 0.12 | 0.08 | 0.12 | 0.07 | 0.05 |
| | Surface Roughness Sa [μm] | Average Value (n = 10) | 0.1 | 0.1 | 0.1 | 0.1 | 0.1 | 0.1 |
| | | Standard Deviation σ [μm] (n = 10) | 0.08 | 0.12 | 0.04 | 0.08 | 0.05 | 0.05 |
| | | σ/T [%] | 0.9 | 1.7 | 0.5 | 1.1 | 0.6 | 0.8 |
| | Heat Stretchability [—] | | ○ | ○ | ○ | ○ | ○ | ○ |

As shown in Tables 1 and 2, in the decorative sheets of Examples 1 to 22, the decorative sheet has low glossiness, the standard deviation [μm] of the surface roughness Sa is 0.2 or less, the standard deviation [μm] of the surface roughness Sa divided by the thickness [μm] of the continuous layer (i.e., σ/T) is 7% or less. It can therefore be seen that the decorative sheets of Examples 1 to 22 have an excellent aesthetic appearance with irregularities uniformly formed in the entire surface of the surface layer.

The results show that the decorative sheets of Examples 16, 17, and 19 using inorganic particles (low-alkali glass, silica fine particles) as a dispersion have lower glossiness than the decorative sheet of Example 18 using organic particles (acrylic copolymer fine particles) as a dispersion.

As shown in Table 3, in the decorative sheets of Comparative Examples 1 to 6, the standard deviation of the surface roughness Sa is higher than 0.2 μm and σ/T is higher than 7%. It can therefore be seen that the decorative sheets of Comparative Examples 1 to 6 have a less aesthetic appearance with irregularities unevenly formed in the entire surface of the surface layer.

In the decorative sheet of Comparative Example 3, the blending ratio of urethane acrylate having low fluidity is high. It can therefore be seen that wrinkles are less likely to be formed in the surface of the surface layer, and the surface layer has high glossiness (does not have low glossiness).

In the decorative sheets of Comparative Examples 7 and 8, excimer irradiation was not performed. It can therefore be seen that wrinkles are not formed in the surface of the coating film, and the surface layer has high glossiness (does not have low glossiness).

As shown in Table 4, in the decorative sheets of Examples 23 to 28 using cellulose nanofiber particles as a dispersion, the surface layer has low glossiness, the standard deviation [μm] of the surface roughness Sa is 0.2 or less, and the standard deviation [μm] divided by the thickness [μm] of the continuous layer (i.e., σ/T) is 7% or less, even when low-alkali glass is not used. It can therefore be seen that the decorative sheets of Examples 23 to 28 has an excellent aesthetic appearance with irregularities uniformly formed in the entire surface of the surface layer.

Figure 4:
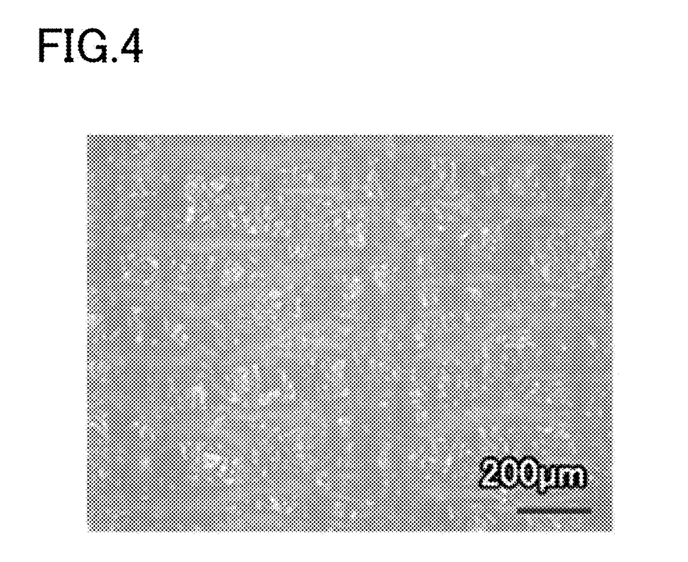
FIG. 4 is a laser micrograph showing the state of the surface of a surface layer in a decorative sheet of Example 23.

It can also be seen from Table 4 that, the decorative sheets of Examples 23 to 28 using cellulose nanofiber particles are used as a dispersion has an excellent aesthetic appearance with no linear cracks along the length in the direction perpendicular to the heat stretching direction, and therefore has high heat stretchability. FIG. 4 shows a laser micrograph showing the state of the surface of the surface layer in the decorative sheet of Example 23 (showing that there are no linear cracks).

As described above, the present invention is suitable for decorative sheets.

The invention claimed is:

1. A decorative sheet, comprising:
a base material; and
a surface layer located on the base material,
wherein:
the surface layer is composed of a continuous layer and a dispersion, the continuous layer being composed of an ultraviolet-cured layer located on a surface of the base material and an excimer light-cured layer located on a surface of the ultraviolet-cured layer, and the dispersion being dispersed in the continuous layer and composed of either or both of organic particles and inorganic particles, and a standard deviation [μm] of surface roughness Sa of an opposite surface of the surface layer from the base material divided by a thickness [μm] of the continuous layer is 7% or less.

2. The decorative sheet of claim 1, wherein the surface layer contains 10 parts by mass or more and 90 parts by mass or less of the dispersion per 100 parts by mass of the continuous layer.

3. The decorative sheet of claim 1, wherein an average particle size of the dispersion is 0.001 times or more and four times or less the thickness of the continuous layer.

4. The decorative sheet of claim 1, wherein the surface layer has a gloss of 13 or less.

5. The decorative sheet of claim 1, wherein the dispersion is cellulose nanofiber particles.

6. The decorative sheet of claim 2, wherein an average particle size of the dispersion is 0.001 times or more and four times or less the thickness of the continuous layer.

7. The decorative sheet of claim 6, wherein the surface layer has a gloss of 13 or less.

8. The decorative sheet of claim 6, wherein the dispersion is cellulose nanofiber particles.

* * * * *